US011072361B2

(12) United States Patent
Mrozek

(10) Patent No.: US 11,072,361 B2
(45) Date of Patent: Jul. 27, 2021

(54) POWER STEERING MOTOR POSITION DETECTION

(71) Applicant: Ford Global Technologies, LLC, Dearborn, MI (US)

(72) Inventor: Robert Marcel Mrozek, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 404 days.

(21) Appl. No.: 16/353,058

(22) Filed: Mar. 14, 2019

(65) Prior Publication Data
US 2020/0290664 A1 Sep. 17, 2020

(51) Int. Cl.
*B62D 5/04* (2006.01)
*B62D 3/12* (2006.01)
*B60R 16/02* (2006.01)

(52) U.S. Cl.
CPC ........... *B62D 5/0421* (2013.01); *B60R 16/02* (2013.01); *B62D 3/12* (2013.01); *B62D 5/0403* (2013.01); *B62D 5/0481* (2013.01)

(58) Field of Classification Search
CPC ...... B62D 3/12; B62D 5/0403; B62D 5/0421; B62D 5/0481; B62D 5/049; B62D 5/0493
See application file for complete search history.

(56) References Cited

U.S. PATENT DOCUMENTS

| | | | |
|---|---|---|---|
| 6,791,219 B1 | 9/2004 | Eric et al. | |
| 7,793,755 B2 | 9/2010 | Ogasawara | |
| 8,322,484 B2 | 12/2012 | Lee | |
| 8,975,793 B2* | 3/2015 | Palfenier | H02K 1/00 310/68 B |
| 9,783,227 B2 | 10/2017 | Shimizu et al. | |
| 10,587,166 B2* | 3/2020 | Fukunaga | H02K 29/08 |
| 2016/0380509 A1* | 12/2016 | Crites | H02K 5/225 310/68 B |
| 2017/0361867 A1 | 12/2017 | Lewis et al. | |
| 2019/0078910 A1* | 3/2019 | Viebach | G01D 5/147 |
| 2019/0097497 A1* | 3/2019 | Fukunaga | H02K 5/04 |

FOREIGN PATENT DOCUMENTS

WO 2017148534 A1 9/2017

* cited by examiner

*Primary Examiner* — Tony H Winner
(74) *Attorney, Agent, or Firm* — Raymond L. Coppiellie; Bejin Bieneman PLC

(57) ABSTRACT

An assembly includes a motor having a shaft. The assembly includes a first gear operatively coupled to the shaft. The assembly includes a second gear operatively coupled to the shaft. The assembly includes a first magnet supported by the first gear. The assembly includes a second magnet supported by the second gear. The assembly includes a first sensor configured to detect the first magnet. The assembly includes a second sensor configured to detect the second magnet.

20 Claims, 6 Drawing Sheets

POWER STEERING MOTOR POSITION DETECTION

BACKGROUND

A steering system of a vehicle controls a steering angle of wheels of the vehicle and thus determines a direction that the vehicle will drive. The steering system can be a rack-and-pinion system with electric power-assisted steering, a steer-by-wire system, etc. The steering system can include an electronic control unit (ECU) or the like that is in communication with and receives input from a computer and/or a human driver. The human driver may control the steering system via, e.g., a steering wheel.

DETAILED DESCRIPTION

Figure 1:
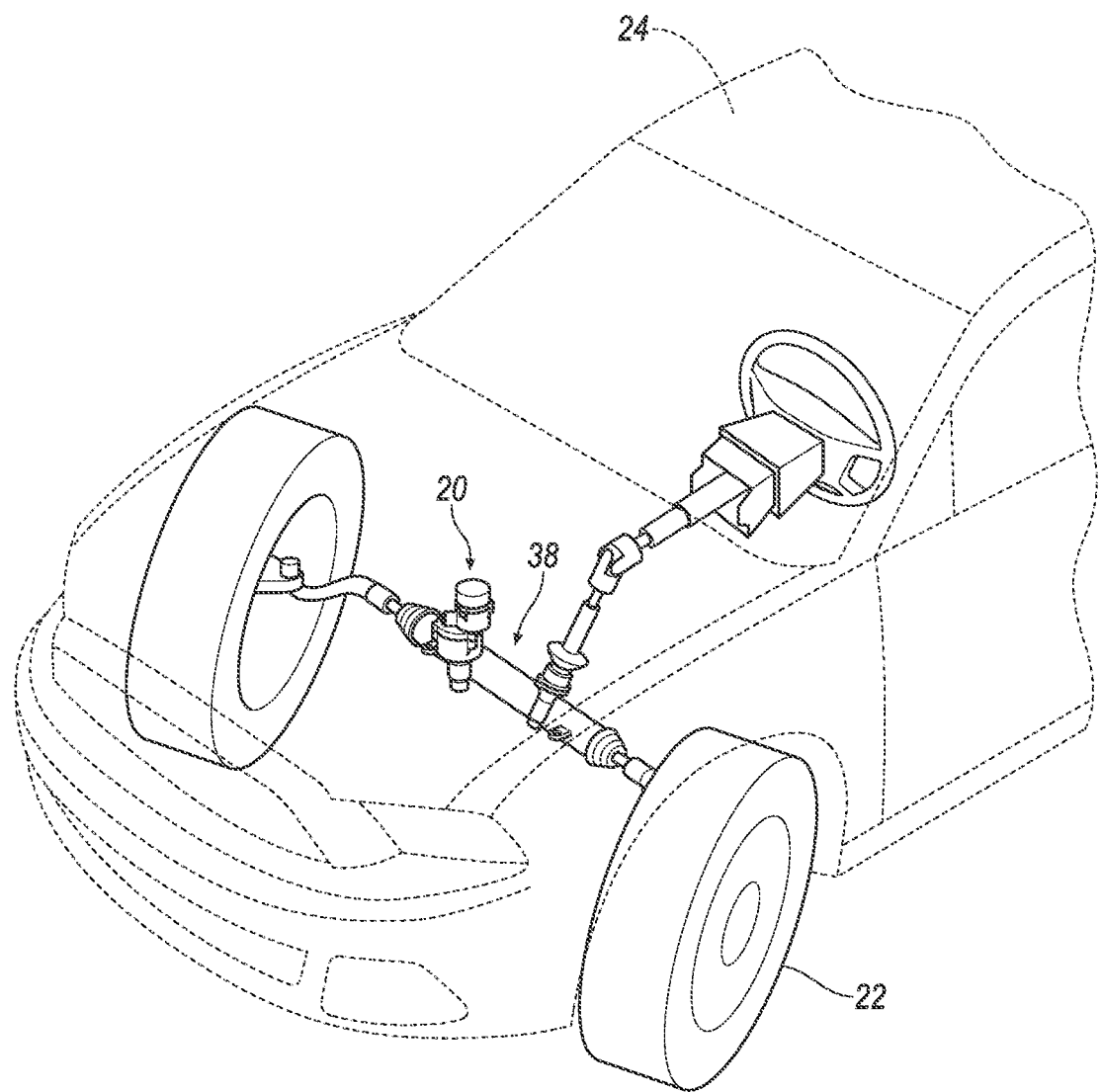
FIG. 1 is a perspective view of a vehicle having a steering system and an assembly for controlling a steering angle of the vehicle.
Figure 2:
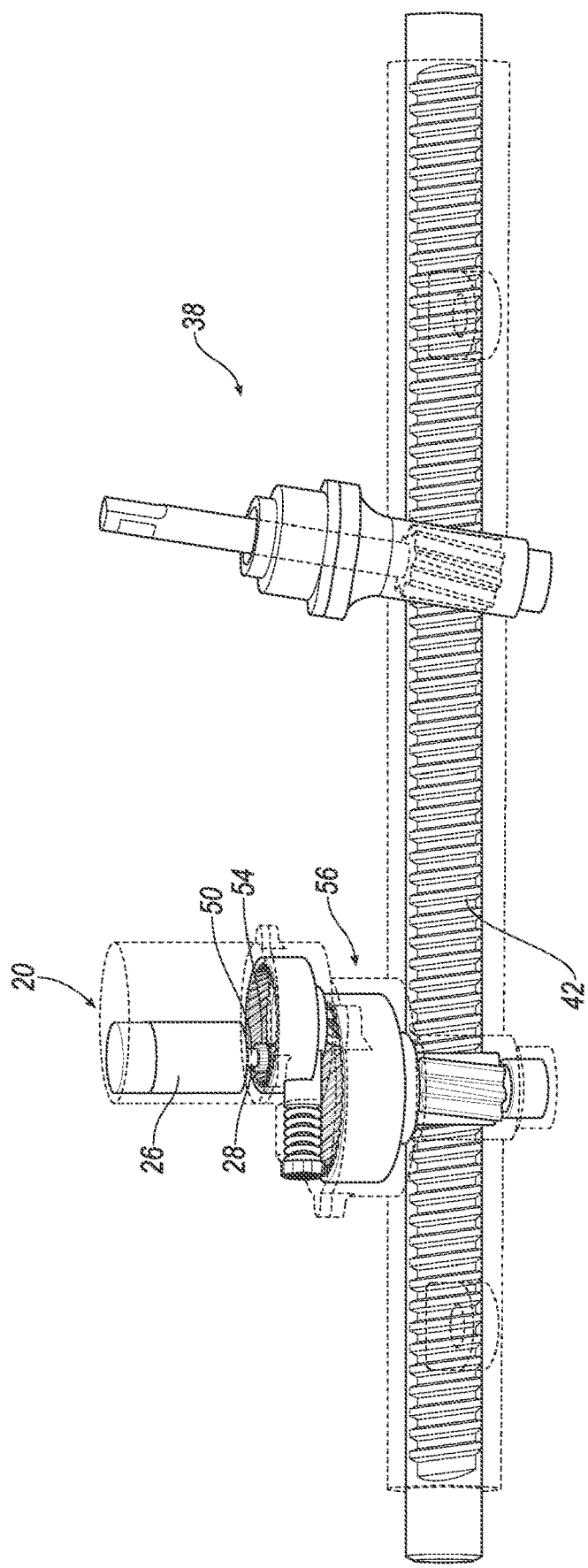
FIG. 2 is a perspective view of the steering system and the assembly for controlling the steering angle.

An assembly includes a motor having a shaft. The assembly includes a first gear operatively coupled to the shaft. The assembly includes a second gear operatively coupled to the shaft. The assembly includes a first magnet supported by the first gear. The assembly includes a second magnet supported by the second gear. The assembly includes a first sensor configured to detect the first magnet. The assembly includes a second sensor configured to detect the second magnet.

The assembly may include a circuit board supporting the first sensor and the second sensor.

The motor may include a housing, the first gear and the second gear between the housing and the circuit board.

The assembly may include a second circuit board, the circuit board between the motor and the second circuit board.

The shaft may include a first end and a second end. The assembly may include a third gear fixed to the first end and meshed with the first gear and the second gear, and a fourth gear fixed to the second end.

The assembly may include a steering rack, the fourth gear operatively coupled with the steering rack.

The motor may include a housing between the third gear and the fourth gear.

The shaft may be elongated along a first axis, the first gear rotatable about a second axis parallel to the first axis, and the second gear rotatable about a third axis parallel to the first axis.

An assembly includes a motor having a shaft elongated along a first axis. The assembly includes a gear operatively coupled to the shaft and rotatable about a second axis parallel to the first axis. The assembly includes a first magnet supported by the gear. The assembly includes a second magnet supported by the shaft. The assembly includes a first sensor configured to detect the first magnet. The assembly includes a second sensor configured to detect the second magnet.

The assembly the assembly may include a circuit board. The motor may include a housing, the gear between the housing and the circuit board.

The circuit board may support the first sensor and the second sensor.

The assembly may include a second circuit board, the circuit board between the second circuit board and the motor.

The assembly may include a first circuit board supporting the first sensor, and a second circuit board supporting the second sensor.

The first circuit board may include an opening, and the shaft may be aligned with the opening.

The shaft may extend into the opening.

The shaft may include a first end and a second end. The assembly may include a second gear fixed to the first end and meshed with the gear, and a third gear fixed to the second end.

The assembly may include a steering rack, the third gear operatively coupled with the steering rack.

The motor may include a housing between the second gear and the third gear.

The first end may extend to a distal edge, the second gear at the distal edge.

The first end may extend to a distal edge, the second gear spaced from the distal edge.

With reference to FIGS. 1, 2, 5, and 6, wherein like numerals indicate like parts throughout the several views, an assembly 20 for controlling a steering angle of wheels 22 of a vehicle 24 includes a motor 26 having a shaft 28. The assembly 20 includes a first gear 30 (such as a satellite gear 30) operatively coupled to the shaft 28. The assembly 20 includes a first magnet 34a supported by the first gear 30. The assembly 20 includes a sensor 36a configured to detect the magnet 34a supported by the first gear 30.

Figure 5:
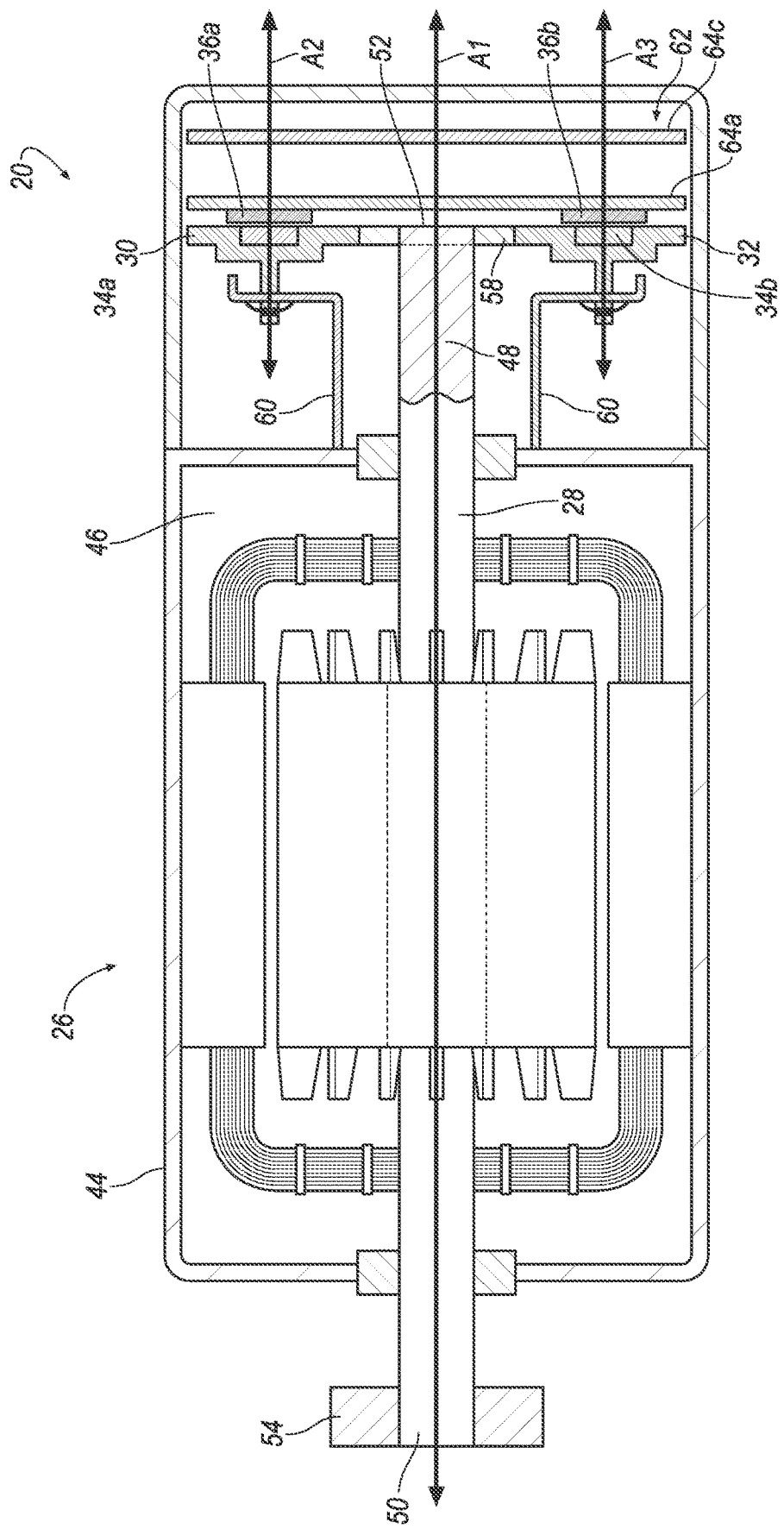
FIG. 5 is a broken away side view of the assembly for controlling the steering angle with two satellite gears.

With reference to FIG. 5, the assembly 20 includes a second gear 32 (such as a second satellite gear 32) operatively coupled to the shaft 28. The assembly 20 includes a second magnet 34b supported by the second gear 32. The assembly 20 includes a sensor 36b configured to detect the magnet 34b supported by the second gear 32.

Figure 3:
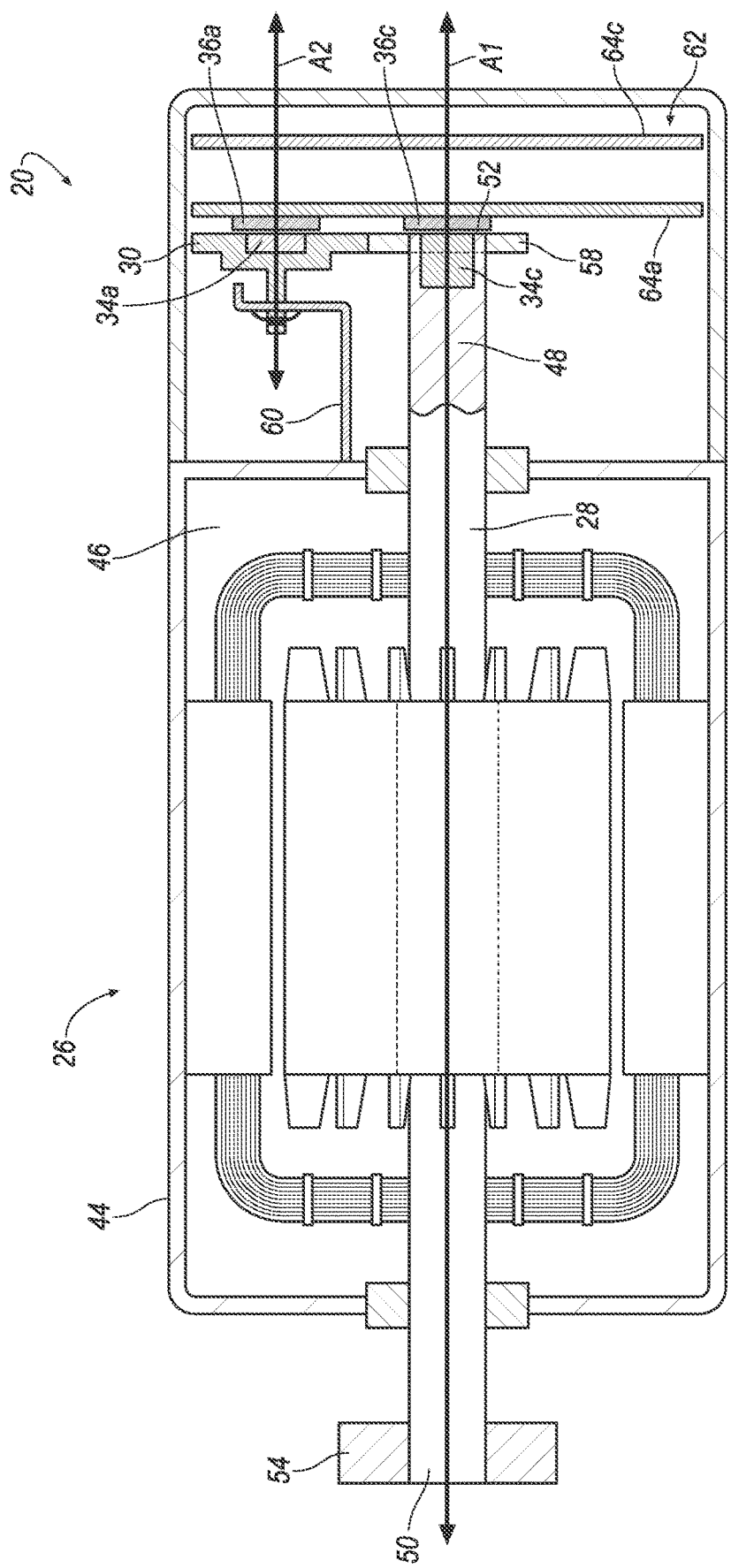
FIG. 3 is a broken away side view of the assembly for controlling the steering angle with one satellite gear.
Figure 4:
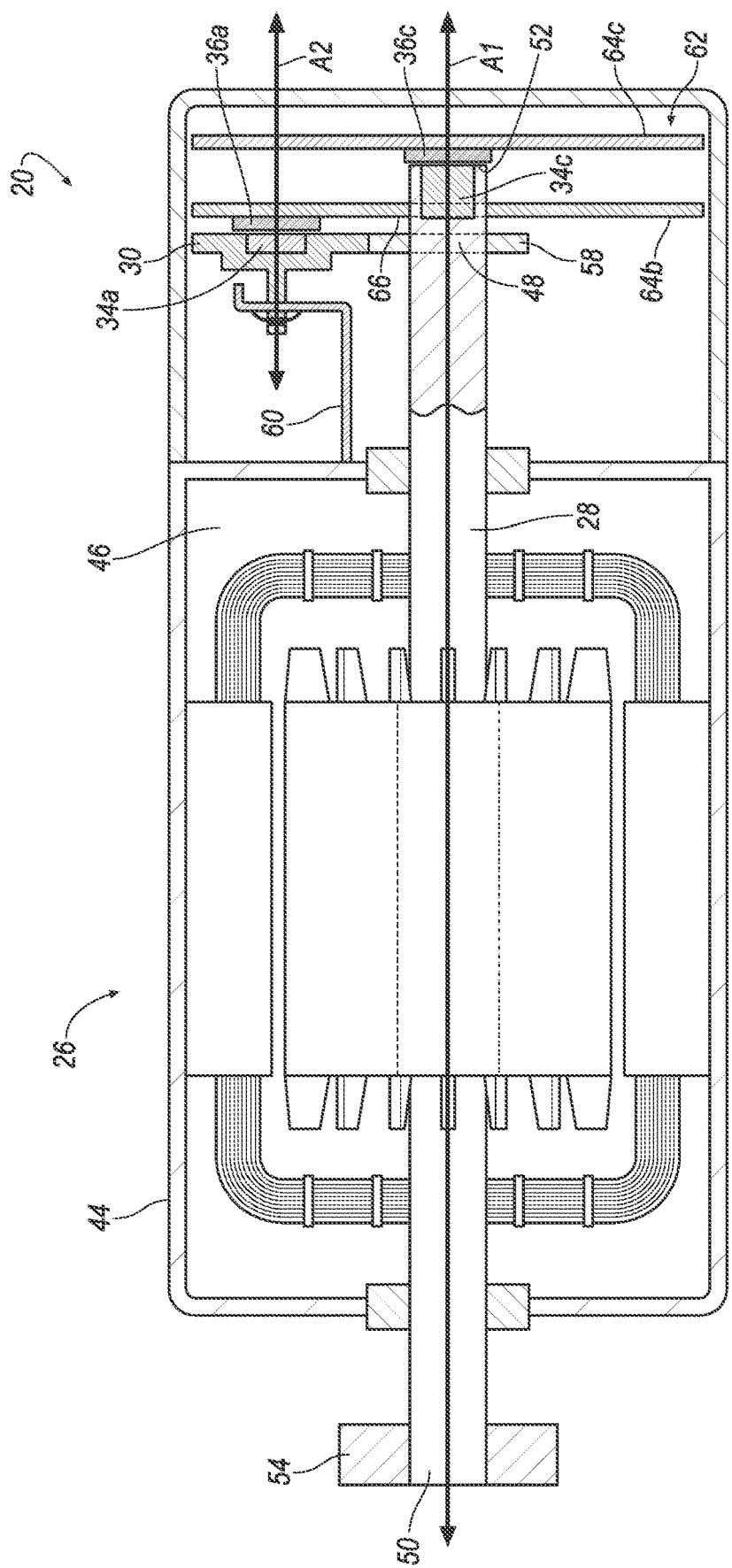
FIG. 4 is another broken away side view of the assembly for controlling the steering angle with one satellite gear and a circuit board having an opening.

With reference to FIGS. 3 and 4, the assembly 20 may include a magnet 34c supported by the shaft 28 of the motor 26 and a sensor 36c configured to detect the magnet 34c supported by the shaft 28 in addition, or as an alternative to, the second gear 32, the second magnet 34b supported by the second gear 32, and the sensor 36b configured to detect such magnet 34b. The shaft 28 of the motor 26 may be elongated along a first axis A1 and the first gear 30 may be rotatable about a second axis A2 parallel to the first axis A1.

The assembly 20 allows for redundant detection of a rotational position and subsequent control of the shaft 28 of the motor 26 while balancing design constraints such as cost, complexity, etc. The adjectives "first," "second," etc., are used throughout this document as identifiers and are not intended to signify importance or order.

The vehicle 24 may be any passenger or commercial automobile such as a car, a truck, a sport utility vehicle, a crossover vehicle, a van, a minivan, a taxi, a bus, etc.

The vehicle 24 includes a frame. The vehicle 24 may be of a unibody construction, in which the frame and a body of the vehicle 24 are a single component. The vehicle 24 may, alternatively, be of a body-on-frame construction, in which the frame supports a body that is a separate component from the frame. The frame and body may be formed of any suitable material, for example, steel, aluminum, etc.

The vehicle 24 includes wheels 22. The wheels 22 control a driving direction of the vehicle 24. A position of the wheels 22, e.g., turned to a right or a left relative to a forward-driving direction, controls the driving direction, e.g., when the wheels 22 are turned to the right the vehicle 24 may navigate to the right. The position of the wheels 22 defines the steering angle, i.e., an amount of deviation of the wheels 22 to the right or left of center.

A steering system 38 controls the steering angle of the wheels 22. The steering system 38 may be in communication with and receive input from a steering wheel and/or a computer 40 of the vehicle 24. For example, the steering system 38 may be a rack-and-pinion steering system. The steering system 38 may be an electric power-assisted system, a steer-by-wire system, or any other suitable system. For example, turning the steering wheel may provide torque to the steering system 38 for turning the wheels 22, and the steering system 38 may also provide an assist mechanism that provides additional power to turn the wheels 22 in a direction indicated by an occupant turning the steering wheel. Alternatively, the steering system 38 may be a standalone system that is mechanically isolated from the steering wheel and provides all the power for turning the wheels 22.

A rack 42 of the steering system 38 transfers torque, e.g., from the motor 26 into lateral motion. The rack 42 may be supported by the frame of the vehicle 24. The rack 42 may include a plurality of teeth arraigned along a length of the rack 42. Application of force to the rack 42, e.g., from torque applied from a gear meshed with the teeth of the rack 42, urges the rack 42 laterally, e.g., relative to the vehicle 24. The rack 42 is connected to the wheels 22 of the vehicle 24. Lateral movement of the rack 42 changes the steering angle of the wheels 22.

The motor 26 generates torque that is applied to the rack 42 and changes the steering angle. The motor 26 is an electric motor 26, e.g., a brushed or brushless motor. The motor 26 may include a stator, windings, magnets, etc.

The motor 26 may include a housing 44 that supports one or more of the shaft 28, stator, windings, magnets, etc. The housing 44 may define a chamber 46. The shaft 28, stator, windings, magnets, etc., may be in the chamber 46.

The shaft 28 is elongated along the first axis A1 between a first end 48 and a second end 50 opposite the first end 48. The first end 48 and the second end 50 may extend away from the housing 44, e.g., outside of the chamber 46. In other words, the housing 44 may be between the first end 48 and the second end 50 of the shaft 28. The first end 48 of the shaft 28 extends to a distal edge 52. The distal edge 52 is spaced from the housing 44 of the motor 26.

The motor 26 is operably coupled to the rack 42 such that torque from the shaft 28 is transferred to the rack 42 and urges the rack 42 to move and change the steering angle. A gear 54 may be fixed to the second end 50 of the shaft 28 e.g., via welding, a fastener, etc.

The gear 54 is operatively coupled with the rack 42 to move the rack 42 in response to torque from the motor 26. For example, torque from the shaft 28 may be transferred via the gear 54 and one or more intermediary gears 56 to the rack 42. The gear 54 and intermediary gears 56 may transfer torque with meshed gear teeth, being rotationally fixed relative to each other, etc. The intermediary gears 56 include reduction gear sets, e.g., having a pinion gear and a larger spur or ring gear meshed with each other, a pinion gear meshed with teeth of the rack 42, etc.

The rotational position of the shaft 28 of the motor 26 is redundantly detected with the satellite gear 30 operatively coupled to the shaft 28 such that rotation of the shaft 28 rotates the satellite gear 30. The satellite gear 30 is spaced from the first axis A1. For example, a gear 58 may be fixed to the first end 48 of the shaft 28, e.g., via welding, a fastener, etc., and meshed with the satellite gear 30. The gear 58 may be at the distal edge 52 of the first end 48 of the shaft 28, as shown in FIGS. 3 and 5. The gear 58 may be spaced from the distal edge 52 of the first end 48 of the shaft 28, as shown in FIG. 4. The gear 58 may be opposite the gear 54 fixed at the second end 50 of the shaft 28 that transfers torque to the rack 42, e.g., with the housing 44 therebetween.

The satellite gear 30 is rotatable about the second axis A2. The second axis A2 is parallel to the first axis A1. For example, the satellite gear 30 may be rotatably supported by a bracket 60, e.g., on a pin elongated along the second axis A2. The bracket 60 may be supported by the housing 44 of the motor 26, or other component of the assembly 20 or vehicle 24. The satellite gear 30 may be spaced from the gear 54 operatively coupled with the steering rack 42. The satellite gear 30 may be outside the chamber 46 of the housing 44. For example, the housing 44 of the motor 26 may be between the satellite gear 30 and the gear 54 operatively coupled with the steering rack 42.

With refence to FIG. 5, the assembly 20 may include the second satellite gear 32 operatively coupled to the shaft 28 such that rotation of the shaft 28 rotates the second satellite gear 32. The second satellite gear 32 is spaced from the first axis A1 and may be rotatable about a third axis A3 that is parallel to the first axis A1 and the second axis A2. For example, the second satellite gear 32 may be meshed with the gear 58 fixed to the first end 48 of the shaft 28 of the motor 26. The second satellite gear 32 may be supported by a bracket 60 supported by the housing 44 of the motor 26, or other component of the assembly 20 or vehicle 24. The second satellite gear 32 may be spaced from the gear 54 operatively coupled with the steering rack 42. The second satellite gear 32 may be outside the chamber 46 of the housing 44. For example, the housing 44 of the motor 26 may be between the second satellite gear 32 and the gear 54 operatively coupled with the steering rack 42.

Returning to FIGS. 3-5, magnets 34a, 34b, 34c enable the rotational position of the motor 26 to be redundantly detected. The magnets 34a, 34b, 34c generate a magnetic field. The magnets 34a, 34b, 34c may be any suitable material that generates a magnetic field. Example materials include ferromagnetic or ferrimagnetic materials such as iron, nickel, cobalt, including alloys thereof, and compounds of rare earth metals.

One of the magnets 34a is supported by the satellite gear 30, e.g., via adhesive, fastener, interference fit into a boss, overmolded (e.g., with the magnet 34a as a substrate), etc. The magnet 34a supported by the satellite gear 30 may be on the second axis A2. For example, the magnet 34a may be supported at a center of the satellite gear 30. Similarly, and with reference to FIG. 5, one of the magnets 34b may be supported by the second satellite gear 32, e.g., on the third axis A3.

With reference to FIGS. 3 and 4, one of the magnets 34c may be supported by the shaft 28 of the motor 26 e.g., via adhesive, fastener, interference fit into a boss, overmolded (e.g., with the magnet 34c as a substrate), etc. The magnet 34c may be at the first end 48 of the shaft 28, e.g., at the distal edge 52 and on the first axis A1.

Returning to FIGS. 3-6, the assembly 20 may include an electronic control unit (ECU) 62 that controls the motor 26, e.g., based on commands from the steering wheel, the computer 40 of the vehicle 24, etc. The ECU 62 may include one or more processors, memory, circuits, chips, etc. The processors, memory, circuits, chips, etc., may be partitioned, e.g., such that one or more processors, memory, circuits, chips, etc., are configured to regulate power to control rotation of the shaft 28 the motor 26, and such that separate processors, memory, circuits, chips, etc., are configured to determine a rotational position of the motor 26, e.g., based on information from the sensors 36a, 36b, 36c. The ECU 62 may include redundant partitions, e.g., second processors, memory, circuits, chips, etc., to control the motor 26 and second processors, memory, circuits, chips, etc., to determine the rotational position.

The ECU 62 may include one or more circuit boards 64a, 64b, 64c. The circuit boards 64a, 64b, 64c support the processors, memory, circuits, chips, etc., of the ECU 62. The partitions may be supported on separate circuit boards 64a, 64b, 64c. For example, the processors, memory, circuits, chips etc., for controlling the motor 26 may be supported on one circuit board 64a, 64b and the processors, memory, circuits, chips etc., for determining the rotational position of the motor 26 may be supported on another circuit board 64c. As another example, the processors, memory, circuits, chips, etc., for determining the rotational position of the motor 26 may be supported on one circuit board 64a, 64b and the redundant processors, memory, circuits, chips, etc., for determining the rotational position of the motor 26 may be supported on another circuit board 64c. The circuit boards 64a, 64b, 64c may be stacked relative to the motor 26, i.e., with one circuit board 64a, 64b closer to the motor 26 than the other circuit board 64c. In other words, one circuit board 64a, 64b may be between another circuit board 64c and the motor 26. The circuit boards 64a, 64b, 64c may be opposite the housing 44 of the motor 26 relative to the gears 30, 32, 58. In other words, the gears 30, 32, 58 may be between the housing 44 and the circuit boards 64a, 64b, 64c.

With reference to FIG. 4, the circuit board 64b closest to the housing 44 of the motor 26, e.g., along the first axis A1, may include an opening 66. The shaft 28 of the motor 26 may be aligned with the opening 66. In other words, the opening 66 may be on the first axis A1. For example, the first end 48 of the shaft 28 may extend away from the housing 44 and into the opening 66.

Returning to FIGS. 3-6, the sensors 36a, 36b, 36c detect the magnets 34a, 34b, 34c. For example, the sensor 36a, 36b, 36c may provide information specifying a proximity of the sensor 36a, 36b, 36c to a detected magnet 34a, 34b, 34c or a movement of a detected magnet 34a, 34b, 34c, e.g., by detecting the magnetic field of the magnet 34a, 34b, 34c including changes in strength and movement the magnetic field. The sensors 36a, 36b, 36c may be, for example, Hall effect sensors. The sensors 36a, 36b, 36c may be supported by the circuit board(s) 64a, 64b, 64c. For example, the sensor 36a, 36b, 36c may be supported by the same circuit board 64 (shown in FIGS. 3 and 5). As another example, one sensor 36a may be supported by one of the circuit boards 64a and another sensor 36c may be supported by another circuit board 64b (shown in FIG. 4). The sensor 36a, 36b, 36c may be in electrical communication with the processors, memory, circuits, chips, etc., of the ECU 62, i.e., such that electrical information, data, signals, power, etc., may be communicated there between.

One of the sensors 36a is configured to detect the magnet 34a supported by the satellite gear 30. For example, the sensor 36a may be supported by the circuit board 64a closest to the housing 44. The sensor 36a may be fixed to the circuit board 64a on a surface facing the motor 26. The sensor 36a may be aligned with the magnet 34a, e.g., the sensor 36a and the magnet 34a may be on the second axis A2. The sensor 36a may be close enough to the magnet 34a to detect the magnetic field of the magnet 34a.

With reference to FIGS. 3 and 4, one of the sensors 36c may be configured to detect the magnet 34c supported by the shaft 28 of the motor 26. The sensor 36c may be aligned with the magnet 34c, e.g., the sensor 36c and the magnet 34c may be on the first axis A1. The sensor 36c may be close enough to the magnet 34c to detect the magnetic field of the magnet 34c. For example, and as shown in FIG. 3, the sensor 36c may be supported by the circuit board 64a closest to the housing 44, e.g., the circuit board 64a supporting the sensor 36a configured to detect the magnet 34a supported by the satellite gear 30. The sensor 36c may be fixed to the circuit board 64a on the surface facing the motor 26. As another example, and as shown in FIG. 4, the sensor 36c may be supported by the circuit board 64b further from the housing 44, e.g., relative to the circuit board 64a supporting the sensor 36a configured to detect the magnet 34a supported by the satellite gear 30. The sensor 36c may be fixed to the circuit board 64a, 64c on a surface facing the motor 26.

With reference to FIG. 5, one of the sensors 36b may be configured to detect the magnet 34b supported by the second satellite gear 32. For example, the sensor 36b may be supported by the circuit board 64a closest to the housing 44, e.g., the circuit board 64a supporting the sensor 36a configured to detect the magnet 34a supported by the satellite gear 30. The sensor 36b may be fixed to the circuit board 64a on the surface facing the motor 26. The sensor 36b may be aligned with the magnet 34b, e.g., the sensor 36b and the magnet 34b may be on the third axis A3. The sensor 36b may be close enough to the magnet 34b to detect the magnetic field of the magnet 34b.

The vehicle 24 may include a navigation system 72 that can determine a location of the vehicle 24. The navigation system 72 is implemented via circuits, chips, or other electronic components. The navigation system 72 may be implemented via satellite-based system such as the Global Positioning System (GPS). The navigation system 72 may triangulate the location of the vehicle 24 based on signals received from various satellites in the Earth's orbit. The navigation system 72 is programmed to output signals representing the location of the vehicle 24 to, e.g., to the computer 40 via a communication network 70. In some instances, the navigation system 72 is programmed to determine a route from the present location to a future location. The navigation system 72 may access a virtual map stored in memory of the navigation system 72 and/or computer 40 and develop the route according to the virtual map data. The virtual map data may include lane information, including a number of lanes of a road, widths and edges of such lanes, etc. The navigation system 72 may store specified locations, e.g., as GPS coordinates.

The vehicle 24 may include additional sensors 68. The sensors 68 may detect internal states of the vehicle 24, for example, wheel speed, wheel orientation, steering wheel position, and engine and transmission variables. The sensors 68 may detect the position or orientation of the vehicle 24, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 68 may detect the external world, for example, radar sensors, scanning laser range finders, light detection and ranging (LIDAR)

devices, and image processing sensors such as cameras. The sensors 68 may include communications devices, for example, vehicle-to-infrastructure (V2I) or vehicle-to-vehicle (V2V) devices.

The communication network 70 includes hardware, such as a communication bus, for facilitating communication among vehicle 24 components, such as the computer 40, the steering system 38, and the sensors 68. The communication network 70 may facilitate wired or wireless communication among the vehicle 24 components in accordance with a number of communication protocols such as controller area network (CAN), Ethernet, WiFi, Local Interconnect Network (LIN), and/or other wired or wireless mechanisms.

Figure 6:
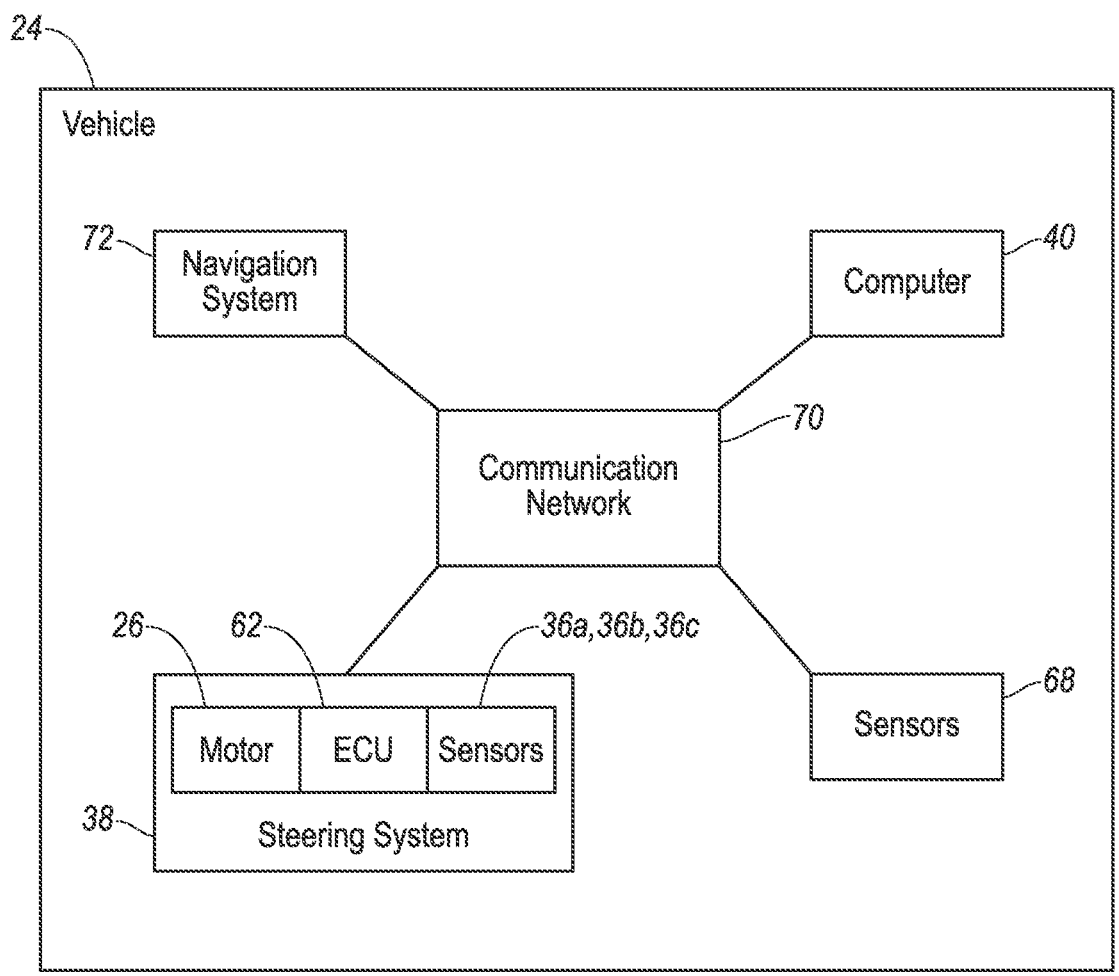
FIG. 6 is a block diagram of components of the vehicle.

The computer 40, implemented via circuits, chips, or other electronic components, carries out various operations, including as described herein. The computer 40 is a computing device that generally includes a processor and a memory, the memory including one or more forms of computer-readable media and storing instructions executable by the processor for performing various operations, including as disclosed herein. The memory of the computer 40 further generally stores remote data received via various communications mechanisms; e.g., the computer 40 is generally configured for communications on the communication network 70 or the like, and may include a transceiver, and/or may be configured for using other wired or wireless protocols, e.g., Universal Serial Bus (USB), Bluetooth®, IEEE 802.11 (colloquially referred to as WiFi®), satellite telecommunication protocols, and cellular protocols such as 3G, LTE, etc. The computer 40 may also have a connection to an onboard diagnostics connector (OBD-II). Via the communication network 70 and/or other wired or wireless mechanisms, the computer 40 may transmit messages to various devices in the vehicle 24 and/or receive messages from the various devices. Although one computer 40 is shown in FIG. 6 for ease of illustration, it is to be understood that the computer 40 could include, and various operations described herein could be carried out by, one or more computing devices including computing devices remote from and in communication with the vehicle 24.

The computer 40 may be programed to control the steering assembly 20 to change the steering angle. For example, the computer 40 may send a command to the ECU 62 of the steering system 38 commanding actuation of the motor 26 to move the wheels 22 to a specified steering angle. The computer 40 may command the steering system 38 based on data from the sensors 68, e.g., specifying a position of the steering wheel. The computer 40 may command the steering system 38 based on data from the sensors 68 and the navigation system 72, e.g., to autonomously navigate the vehicle 24 to a specified destination, the avoid an obstacle, to execute a vehicle maneuver such as parallel parking, etc.

Returning to FIGS. 2-6, rotation of the shaft 28 of the motor 26, e.g., controlled by the ECU 62 and in response to a command from the computer 40 specifying a steering angle, rotates the gears 30, 32 and the magnets 34a, 34b, 34c. Rotation of the magnets 34a, 34b, 34c is detected by the sensors 36a, 36b, 36c. Based on the detected rotation, the ECU 62 identifies a rotational position of the shaft 28 of the motor 26. Data from the sensors 36a, 36b, 36c specifying the rotational position of the shaft 28 may be used by the ECU 62 and/or the computer 40, e.g., to verify that the steering angle of the wheels 22 matches the commanded steering angle from the computer 40. The ECU 62 and/or computer 40 may further actuate the motor 26 to correct the steering angle if a discrepancy exists between the commanded steering angle and detected rotational position of the shaft 28.

Having multiple magnets 34a, 34b, 34c and sensors 36a, 36b, 36c and supporting the sensor 36a, 36b, 36c on separate circuit boards 64a, 64b, 64c, provides redundancy to the detection of the rotational position of the shaft 28. For example, if one of the sensors 36a, 36b, 36c or one of circuit boards 64a, 64b, 64c are non-functional, or if one of the magnets 34a, 34b, 34c are not properly supported for detection by the sensors 36a, 36b, 36c, the assembly 20 will still be able to determine the rotational position of the shaft 28 with the other sensors 36a, 36b, 36c, magnet 34a, 34b, 34c, and/or circuit board 64a, 64b, 64c.

Computing devices, such as the computer 40 and the ECU 62, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a motor having a shaft;
   a first gear operatively coupled to the shaft;
   a second gear operatively coupled to the shaft;
   a first magnet supported by the first gear;
   a second magnet supported by the second gear;
   a first sensor configured to detect the first magnet; and
   a second sensor configured to detect the second magnet.

2. The assembly of claim 1, further comprising a circuit board supporting the first sensor and the second sensor.

3. The assembly of claim 2, wherein the motor includes a housing, the first gear and the second gear between the housing and the circuit board.

4. The assembly of claim 2, further comprising a second circuit board, the circuit board between the motor and the second circuit board.

5. The assembly of claim 1, wherein the shaft includes a first end and a second end, and further comprising a third gear fixed to the first end and meshed with the first gear and the second gear, and a fourth gear fixed to the second end.

6. The assembly of claim 5, further comprising a steering rack, the fourth gear operatively coupled with the steering rack.

7. The assembly of claim 5, wherein the motor includes a housing between the third gear and the fourth gear.

8. The assembly of claim 1, wherein the shaft is elongated along a first axis, the first gear rotatable about a second axis parallel to the first axis, and the second gear rotatable about a third axis parallel to the first axis.

9. An assembly, comprising:
   a motor having a shaft elongated along a first axis;
   a gear operatively coupled to the shaft and rotatable about a second axis parallel to the first axis;
   a first magnet supported by the gear;
   a second magnet supported by the shaft;
   a first sensor configured to detect the first magnet; and
   a second sensor configured to detect the second magnet.

10. The assembly of claim 9, further comprising a circuit board, and wherein the motor includes a housing, the gear between the housing and the circuit board.

11. The assembly of claim 10, wherein the circuit board supports the first sensor and the second sensor.

12. The assembly of claim 11, further comprising a second circuit board, the circuit board between the second circuit board and the motor.

13. The assembly of claim 9, further comprising a first circuit board supporting the first sensor, and a second circuit board supporting the second sensor.

14. The assembly of claim 13, wherein the first circuit board includes an opening, and the shaft is aligned with the opening.

15. The assembly of claim 14, wherein the shaft extends into the opening.

16. The assembly of claim 9, wherein the shaft includes a first end and a second end, and further comprising a second gear fixed to the first end and meshed with the gear, and a third gear fixed to the second end.

17. The assembly of claim 16, further comprising a steering rack, the third gear operatively coupled with the steering rack.

18. The assembly of claim 16, wherein the motor includes a housing between the second gear and the third gear.

19. The assembly of claim 16, wherein the first end extends to a distal edge, the second gear at the distal edge.

20. The assembly of claim 16, wherein the first end extends to a distal edge, the second gear spaced from the distal edge.

* * * * *